UNITED STATES PATENT OFFICE.

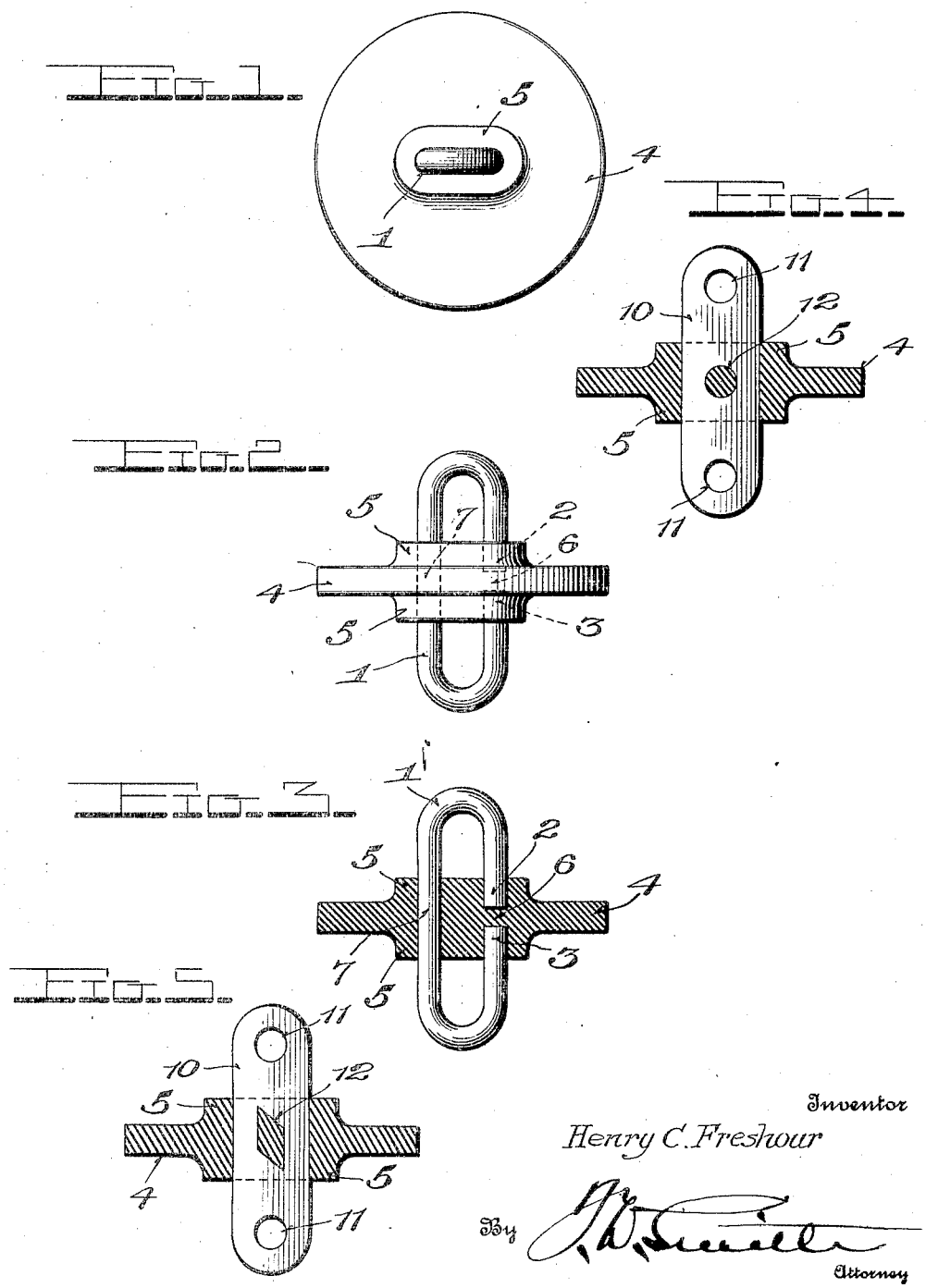

HENRY C. FRESHOUR, OF PITMAN, NEW JERSEY.

CHAIN-PUMP BUCKET.

1,319,468.   Specification of Letters Patent.   Patented Oct. 21, 1919.

Application filed June 30, 1919. Serial No. 307,830.

*To all whom it may concern:*

Be it known that I, HENRY C. FRESHOUR, a citizen of the United States, residing at the town of Pitman, in the county of Gloucester and State of New Jersey, have invented certain new and useful Improvements in Chain-Pump Buckets; and I do declare the following to be a full, clear, and exact description of the invention, such as will enable others skilled in the art to which it appertains to make and use the same.

This invention relates to certain new and useful improvements in chain pump buckets, and the primary object of the invention is to provide an improved and simplified form of rigidly and effectively connecting the rubber disk forming the bucket proper to the link.

The invention briefly involves a rubber disk which is centrally thickened on each of its opposite faces, and a link which is formed with an opening or has its ends spaced apart and directly confronting each other, whereby to form two opposed walls, each of which is free and forms an anchor projecting into the rubber body, the space between such walls being filled by the rubber body which latter is molded about the link, whereby a rubber web extends in said space and acts to prevent movement of the disk longitudinally of the link.

In the drawings:

Figure 1, is a top plan view of the invention;

Fig. 2, is a side elevation,

Fig. 3, is a vertical sectional view,

Fig. 4, is a view similar to Fig. 3 of a modified form of link, and

Fig. 5, is a view similar to Fig. 3, of a further form.

In proceeding in accordance with the present invention, a link 1, is employed formed of a single length of wire, bent to form an ovaloid link with however, the ends 2, and 3 spaced apart as depicted in Fig. 3, of the drawings.

The bucket 4, has thickened or reinforced upper and lower portions 5, 5, which portions are of circular form corresponding to the contour of the disk. The bucket is molded about the central portion of the link so that the terminals of the ends 2, 3, extend about at the transverse center of the rubber body thus providing a web 6, of rubber which fills the space between said ends 2 and 3, and acts to prevent movement of the bucket longitudinally of the link. These ends moreover provide individual anchorages for the rubber body in addition to the anchorage afforded by the uninterrupted side 7, of the link, so that the rubber disk is provided with three distinct points of anchorage to the link. The ends 2, and 3, have preferably flat faced free terminals so as to afford maximum area for the rubber to contact with to thereby prevent any longitudinal movement of the link or disk each with relation to the other.

In addition, the reinforcements coöperate with the loop-like ends of the link to provide further anchorages for the rubber disk, bracing and reinforcing the latter in an obvious manner.

In the modified forms, the link 10, has end holes 11, for coupling connection with the adjacent links and a central opening 12, the rubber disk being molded as in the preferred form to occupy the opening 12, and provide a web of rubber integral with the mass which acts similar to the web 6, in the preferred form, the ends of the opening 12, affording opposed end walls, as is obvious. These openings may be of any shape desired as Figs. 4 and 5 suggest.

What is claimed is:

1. In a chain pump bucket, a link having ends spaced apart, and a single integral rubber disk molded about the link and about said ends and having an integral part forming a central web extending through the space between said ends, the ends of the link extending beyond the respective opposite faces of the rubber disk and being open, the disk having central enlargements on its opposed faces which extend through the openings between the link sides.

2. In a chain pump bucket, a link having spaced opposed walls which confront each other and a single integral rubber disk molded about the link and having an integral central part forming a web extending through the space between said walls the ends of the link extending beyond the respective opposite faces of the rubber disk.

In testimony whereof I affix my signature in presence of two witnesses.

HENRY C. FRESHOUR.

Witnesses:
F. W. SMITH,
M. T. LONGDEN.